B. H. SMITH.
ELECTRICAL PROTECTIVE DEVICE.
APPLICATION FILED APR. 5, 1916.

1,354,142.  Patented Sept. 28, 1920.

WITNESSES:
R. J. Fitzgerald
J. A. Procter

INVENTOR
Benjamin H. Smith.
BY
Wesley G. Carr
ATTORNEY

UNITED STATES PATENT OFFICE.

BENJAMIN H. SMITH, OF TURTLE CREEK, PENNSYLVANIA, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,354,142.  Specification of Letters Patent.  Patented Sept. 28, 1920.

Application filed April 5, 1916. Serial No. 89,068.

*To all whom it may concern:*

Be it known that I, BENJAMIN H. SMITH, a citizen of the United States, and a resident of Turtle Creek, in the county of Allegheny and State of Pennsylvania, have invented a new and useful Improvement in Electrical Protective Devices, of which the following is a specification.

My invention relates to electrical protective devices and particularly to definite time-limit relays.

The object of my invention is to provide a relay of the above indicated character that shall be cheap to construct and efficient and positive in its operation.

Copending U. S. application Serial No. 771,888, filed June 5, 1913, by Almon W. Copley and Benjamin H. Smith, and assigned to the Westinghouse Electric and Manufacturing Company, discloses a relay that is provided with a normally-saturated transformer for the purpose of producing a definite time element in the operation of the relay. In my present invention, I provide a similar relay, but, instead of inductively connecting the two main windings of the relay through a saturatable transformer, I connect the two windings in parallel relation and cause their impedances to be such that the phase-angular relation between the currents traversing the two windings shall vary in accordance with the current traversing the circuit to be protected.

My invention is primarily intended as a relay but may be adapted to other applications. It is to be understood, therefore, that the references to relays in the following description do not limit the application of the invention or restrict the scope of the claims.

Figure 1:
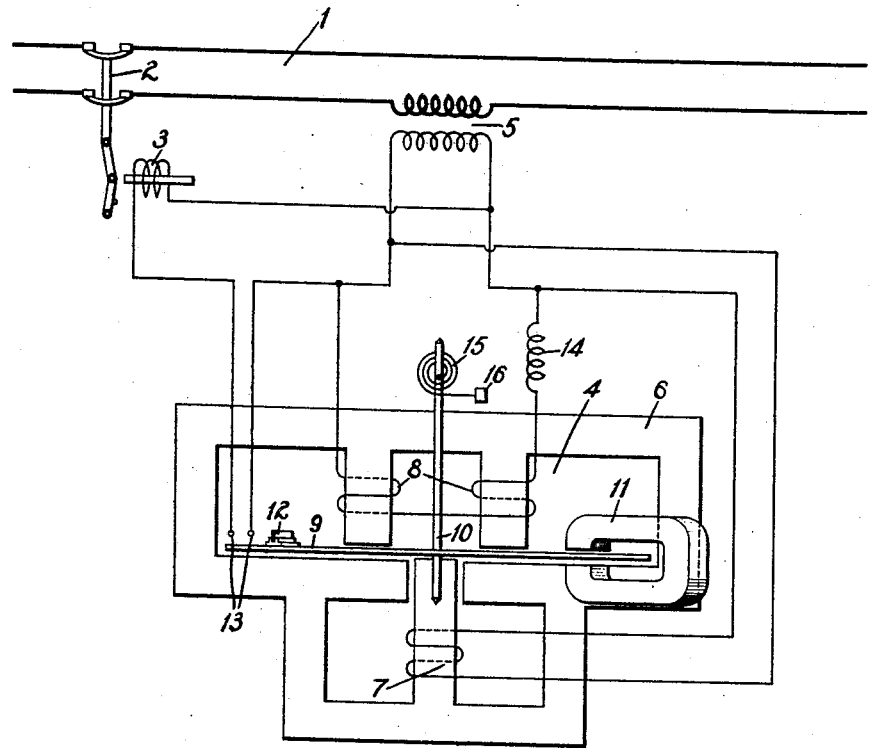
Figure 2:
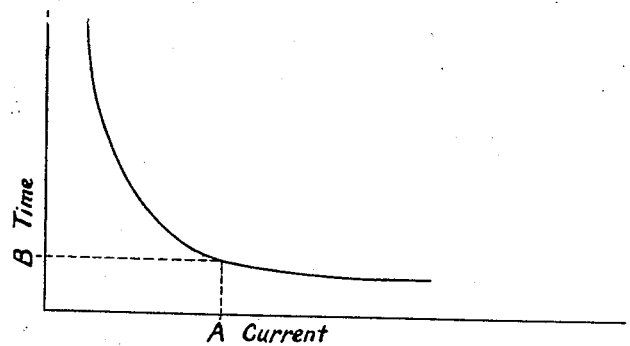

In the accompanying drawing, Figure 1 is a diagrammatic view of an electric circuit in which is connected a relay embodying my invention, and Fig. 2 is a diagram illustrating the load-time curve obtained with a relay embodying my invention.

An electrical circuit 1 is provided with an interrupter 2, a trip coil 3 therefor and a time-limit relay 4 that is supplied with current through a transformer 5. The relay 4 is provided for controlling the circuit of the trip coil 3 and operates in a manner hereinafter more fully set forth.

The relay 4 comprises a magnetizable core member 6 having a main current winding 7 and auxiliary windings 8 thereon. An armature 9 is mounted on a shaft 10 and is adapted to turn in the air gap of the magnetizable member 6 and also between the poles of a permanent damping magnet 11 for the purpose of retarding its motion. A bridging contact member 12 is mounted on the armature 9 and is adapted to engage stationary contact members 13 for the purpose of operatively connecting the trip coil 3 to the secondary winding of the transformer 5. While I have shown the trip coil 3 as adapted to be supplied with energy from the transformer 5, it may, of course, be supplied with energy from any other source of electromotive force.

The winding 7 of the relay 4 is connected to the secondary winding of the transformer 5 and, consequently, is energized in accordance with the current traversing the circuit 1. The windings 8 are connected in series with a reactor 14, and the circuit, thus constituted, is connected in parallel relation to the winding 7. Thus, the windings 8 are energized by current that is proportional to the current traversing the circuit 1. However, the relative impedances of the winding 7 and 8 are such that the phase-angular relation between the currents traversing the same varies.

When a predetermined load traverses the circuit 1, a proportional current traverses the secondary winding of the transformer 5, and, consequently, the windings 7 and 8 of the relay 4. Thus, the windings 7 and 8 will induce magnetic lines of force in the magnetizable core member 6 which will coöperate to cause the armature 9 to turn. The phase-angular relation between the currents in the windings 7 and 8, at relatively low overloads, is such that the speed of rotation of the armature 9 will vary in accordance with the current traversing the circuit 1. However, when a predetermined load is reached, the magnetizable core member 6 becomes saturated and the phase-angular relation between the currents traversing the windings will so vary that the armature 9 will turn at a predetermined definite speed, irrespective of the load traversing the circuit 1. That is, under normal overloads the impedance of the windings 7 and 8 is such that the phase-angular relation therebetween is not appreciably affected. However, when an excessive overload traverses the circuit, the relation between the impedance of the windings 7 and 8, by reason of the saturation of the core member, is such that the phase-angular relation will change. Since the speed of the armature 9 varies in accordance with the flux induced in the core member 6 and the phase-angular relation between the currents traversing the coöperating windings, if the phase-angular relation is so shifted that the speed is decreased and the flux remains substantially constant by reason of the core member becoming saturated, the speed of the armature may be substantially constant for all values of overload above a predetermined value. This will be readily seen in the diagram shown in Fig. 2 of the drawing, in which instance, when the current traversing the circuit 1 is "A" amperes, the time required for the contact member 12 to bridge the contact members 13 will be a constant value "B."

A spring 15 is connected, at its inner end, to the shaft 10 and, at its outer end, to a stationary member 16, and is adapted to coöperate with the damping magnet 11 to obtain various time-element characteristics within the limits afforded by the relay.

I have described the particular operation of my invention, together with an arrangement of parts which is now considered preferable, but I do not limit my invention except as set forth in the appended claims.

I claim as my invention:

1. A relay for an electric circuit comprising a magnetizable core member, two coöperating parallel-connected current windings therefor, and an armature, portions of the core member being adapted to become magnetically saturated when a predetermined current traverses the circuit whereby the phase relation of the currents traversing the two windings so shifts that the armature develops a substantially constant torque for all values of current above the predetermined value.

2. A relay for an electric circuit comprising a magnetizable core member, two coöperating parallel-connected current windings therefor, and an armature, portions of the core member that are surrounded by one of the windings being adapted to become magnetically saturated under predetermined conditions whereby the phase relation of the currents traversing the two windings so shifts that the armature develops a substantially constant torque.

3. A relay for an electric circuit comprising a magnetizable core member, a current winding disposed thereon, an armature, and an auxiliary winding connected in parallel relation to the current winding, said core member being of such cross-sectional area that the impedance of one of the windings so changes under predetermined overload conditions that the rate of speed of the armature is substantially constant for all values of load above the predetermined overload.

4. A relay comprising a magnetizable core member, a current winding, an armature and an auxiliary winding connected in parallel-relation to the current winding, the portion of the core member upon which the auxiliary winding is disposed being adapted to become magnetically saturated when predetermined currents traverse the windings to cause the phase-angular relations of the currents traversing the windings to be shifted with respect to each other.

5. A relay comprising a magnetizable core member, a current winding, an armature and an auxiliary winding connected in parallel-relation to the current-winding, the portion of the core member upon which the auxiliary winding is disposed being adapted to become magnetically saturated under predetermined load conditions in the relay to cause the phase-angular relations between the currents in the windings to be so shifted that the armature will develop a constant torque above that predetermined load.

6. A relay comprising a magnetizable core member, a current winding, an armature, and an auxiliary winding connected in parallel-relation to the current winding, the portion of the core member upon which one of the windings is disposed being adapted to become magnetically saturated under predetermined load conditions to so shift the phase-angular relation of the currents traversing the windings that the armature operates at a constant speed for all loads above the predetermined load.

7. A relay for an electric circuit comprising a magnetizable core member and two parallel-connected windings supplied with currents proportional to the current traversing the circuit, portions of the core member being adapted to become magnetically saturated to cause the phase-angular relation of the currents in the two windings to vary in accordance with the current traversing the circuit.

8. A relay comprising a magnetizable core member, a current winding, an armature, and an auxiliary winding connected in parallel relation to the current winding, said windings being adapted to actuate the armature in accordance with the current traversing the windings up to a predetermined value of current and the magnetizable core member being adapted to become magnetically saturated at that value of current to so shift the phase relation of the currents traversing the windings that the armature is actuated at a substantially constant speed for all values of current above the predetermined value.

9. A relay comprising a magnetizable core member, a current winding, an armature, and an auxiliary winding connected in parallel relation to the current winding, said windings being adapted to actuate the armature in accordance with the current traversing the windings up to a predetermined value of current and the portion of the core member that is surrounded by the auxiliarly winding being adapted to become magnetically saturated at that value of current to so shift the phase relation of the currents traversing the windings that the armature is actuated at a substantially constant speed for all values of current above the predetermined value.

10. A relay for an electric circuit comprising a magnetizable core member, two coöperating parallel-connected current windings therefor, and an armature, portions of the core member being adapted to become magnetically saturated to cause the armature to develop a substantially constant torque for all values of current traversing the circuit above a predetermined value.

In testimony whereof, I have hereunto subscribed my name this 31st day of March, 1916.

BENJAMIN H. SMITH.